(12) United States Patent
Altammar

(10) Patent No.: US 11,999,558 B1
(45) Date of Patent: Jun. 4, 2024

(54) WIND ENERGY BASED COOLING SYSTEM FOR STORAGE CONTAINER

(71) Applicant: KING FAISAL UNIVERSITY, Al Hasa (SA)

(72) Inventor: Hussain Altammar, Al Hasa (SA)

(73) Assignee: KING FAISAL UNIVERSITY, Al Hasa (SA)

( * ) Notice: Subject to any disclaimer, the term of this patent is extended or adjusted under 35 U.S.C. 154(b) by 0 days.

(21) Appl. No.: 18/540,830

(22) Filed: Dec. 14, 2023

(51) Int. Cl.
*B65D 88/74* (2006.01)
*F03D 9/43* (2016.01)
*F03D 15/00* (2016.01)

(52) U.S. Cl.
CPC ............. *B65D 88/745* (2013.01); *F03D 9/43* (2016.05); *F03D 15/00* (2016.05)

(58) Field of Classification Search
CPC ......... B65D 88/745; F03D 9/43; F03D 15/00; F23L 17/12; F24F 7/007; F24F 7/025; Y02E 10/72; Y02A 30/60; Y02A 20/108
USPC .................................................... 454/250, 15
See application file for complete search history.

(56) References Cited

U.S. PATENT DOCUMENTS

| | | | | |
|---|---|---|---|---|
| 4,051,770 A | * | 10/1977 | Felter ...................... | F24F 7/025 454/345 |
| 4,543,042 A | * | 9/1985 | Lange ....................... | F03D 7/06 416/197 A |
| 6,302,778 B1 | * | 10/2001 | Andrews .................. | F24F 7/025 454/16 |
| 2003/0190883 A1 | * | 10/2003 | Shockey ................... | F24F 7/025 454/19 |
| 2011/0021133 A1 | * | 1/2011 | Zwern ...................... | F24S 10/30 126/621 |

(Continued)

FOREIGN PATENT DOCUMENTS

| | | |
|---|---|---|
| CN | 206583320 U | 10/2017 |
| CN | 214366551 U | 10/2021 |
| CN | 216044206 U | 3/2022 |

(Continued)

OTHER PUBLICATIONS

Wind Towers—passive cooling—Iran.

(Continued)

*Primary Examiner* — Edelmira Bosques
*Assistant Examiner* — Frances F. Hamilton
(74) *Attorney, Agent, or Firm* — Nath, Goldberg & Meyer; Richard C. Litman

(57) ABSTRACT

A wind energy-based cooling system for a storage container such as a rooftop residential water tank. The system includes a housing having one or more walls defining one or more inner surfaces and one or more outer surfaces. The housing includes one or more ventilation openings. Means are included for connecting the housing to an access opening of the storage container. The housing and storage container together define an enclosure. A bearing is positioned within a wall of the housing, and a support shaft is held within the bearing. A wind turbine is in connection with the support shaft and configured to capture wind energy outside of the enclosure. A flywheel is in connected to the turbine as well as a gearing arrangement. A rotor is positioned within the enclosure in connection with the gearing arrangement and configured to direct cooling air towards the contents of the storage container.

6 Claims, 2 Drawing Sheets

(56) References Cited

U.S. PATENT DOCUMENTS

2011/0201264 A1* 8/2011 Hendrickson ........... F23L 17/04
                                                                                           29/401.1
2022/0128005 A1* 4/2022 Smith ..................... F01D 15/10

FOREIGN PATENT DOCUMENTS

| CN | 218897135 U | 4/2023 | |
| DE | 4437438 A1 * | 11/1995 | ............ F03D 13/20 |
| JP | H03-91622 A | 4/1991 | |
| JP | 2014224482 A * | 12/2014 | |
| KR | 20100115398 A * | 10/2010 | |

OTHER PUBLICATIONS

Mutashera, Saad & Maamari, Reem & Shezawi, Maryam & Maamari, Hafsa. (2020). Design of Cooling System for Storage Tank. Journal of Student Research. 10.47611/jsr.vi.886.

* cited by examiner

WIND ENERGY BASED COOLING SYSTEM FOR STORAGE CONTAINER

BACKGROUND

Field

The disclosure of the present patent application relates to wind energy-based cooling systems, and particularly to a wind energy-based cooling system for a storage container.

Description of Related Art

Rooftop residential water tanks are commonly used in various regions, including the Middle East, for domestic use. Such tanks are primarily used to store and reserve water for purposes of ensuring a continuous water supply, particularly in areas where water availability may be intermittent or where there are concerns about water quality. As the name suggests, such tanks are installed on the rooftops of residential buildings. Placing the tanks in elevated positions helps in utilizing gravity to assist in water distribution and pressure. It also maximizes the use of available space in densely populated urban areas.

In the Middle East, where temperatures can be high, special considerations may be taken to manage the temperature of the water stored in rooftop tanks. Insulation or shading may be used to prevent water from becoming excessively hot, as well as electric or solar powered cooling systems. Nonetheless, keeping temperature low in rooftop residential water tanks in the Middle East can be challenging due to the region's high temperatures and intense sunlight.

Furthermore, a disadvantage associated with electric or solar powered cooling systems includes the high cost of such systems as well as the energy consumption associated therewith. A need exists for a reliable, environmentally friendly cooling system for rooftop residential water tanks.

SUMMARY OF THE INVENTION

A wind energy-based cooling system for a storage container, such as a rooftop residential water tank, is provided. The wind energy-based cooling system for a storage container includes a housing having one or more walls defining one or more inner surfaces and one or more outer surfaces. The housing includes one or more ventilation openings therein. The system includes means for connecting the housing to an access opening of a storage container. The housing and the storage container together define an enclosure. A bearing is fastened on a wall of the housing, and a support shaft is held within the bearing. A turbine is in connection with the support shaft and configured to capture wind energy outside of the enclosure. A flywheel is in connection with the turbine as well as a gearing arrangement. A rotor is positioned within the enclosure defined by the housing and the storage container. The rotor is in connection with the gearing arrangement, and configured to direct cooling air towards the contents of the storage container.

In an embodiment, the means for connecting the housing to an access opening of the storage container include threads on the housing, such as on an interior surface of the housing.

In an embodiment, the gearing arrangement is configured to increase a rotational speed of the rotor to a greater rotational speed than that of the turbine.

In an embodiment, the turbine is connected to the support shaft through a flexible coupling. Similarly, the gearing arrangement may be connected to the rotor through a flexible coupling.

In an embodiment, a method of cooling the contents of a storage container using wind energy is provided. The method includes coupling a housing to an access opening of the storage container. The housing includes one or more walls defining one or more inner surfaces and one or more outer surfaces. The housing and storage container together define an enclosure. The method further includes capturing wind energy outside of the enclosure using a turbine, and transferring wind energy captured with the turbine to a flywheel. The rotational energy of the flywheel is transferred to a rotor within the enclosure. The rotor is configured to direct cooling air to the contents of the storage container.

In an embodiment, the method of cooling the contents of a storage container includes transferring the rotational energy of the flywheel to the rotor through a gearing arrangement, wherein the gearing arrangement allows the rotor to attain a greater rotational speed than the turbine.

These and other features of the present subject matter will become readily apparent upon further review of the following specification.

BRIEF DESCRIPTION OF DRAWINGS

Similar reference characters denote corresponding features consistently throughout the attached drawings.

DETAILED DESCRIPTION

Figure 1:
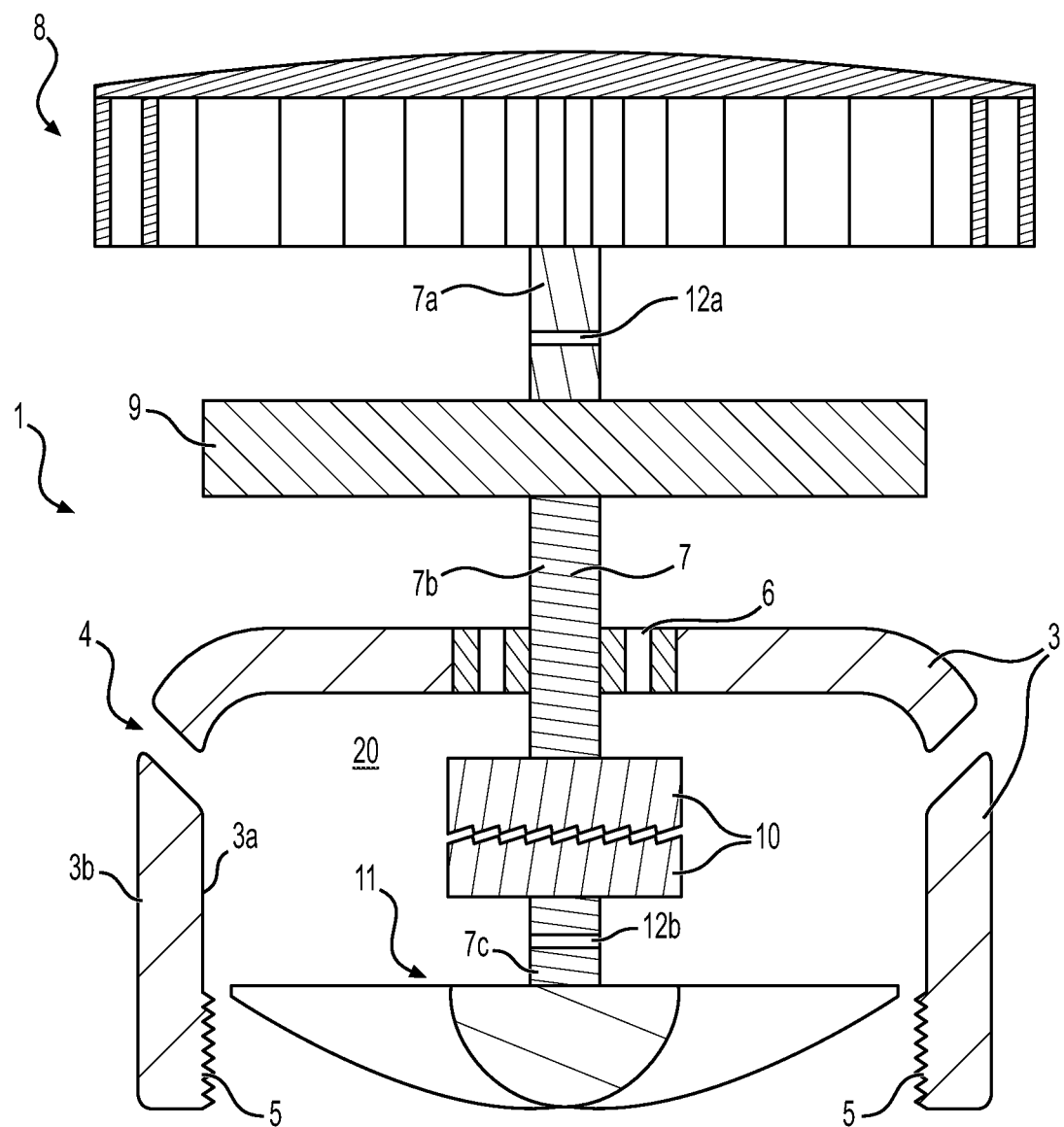
FIG. 1 is a side partial cutaway view of a wind energy-based cooling system for a storage container.
Figure 2:
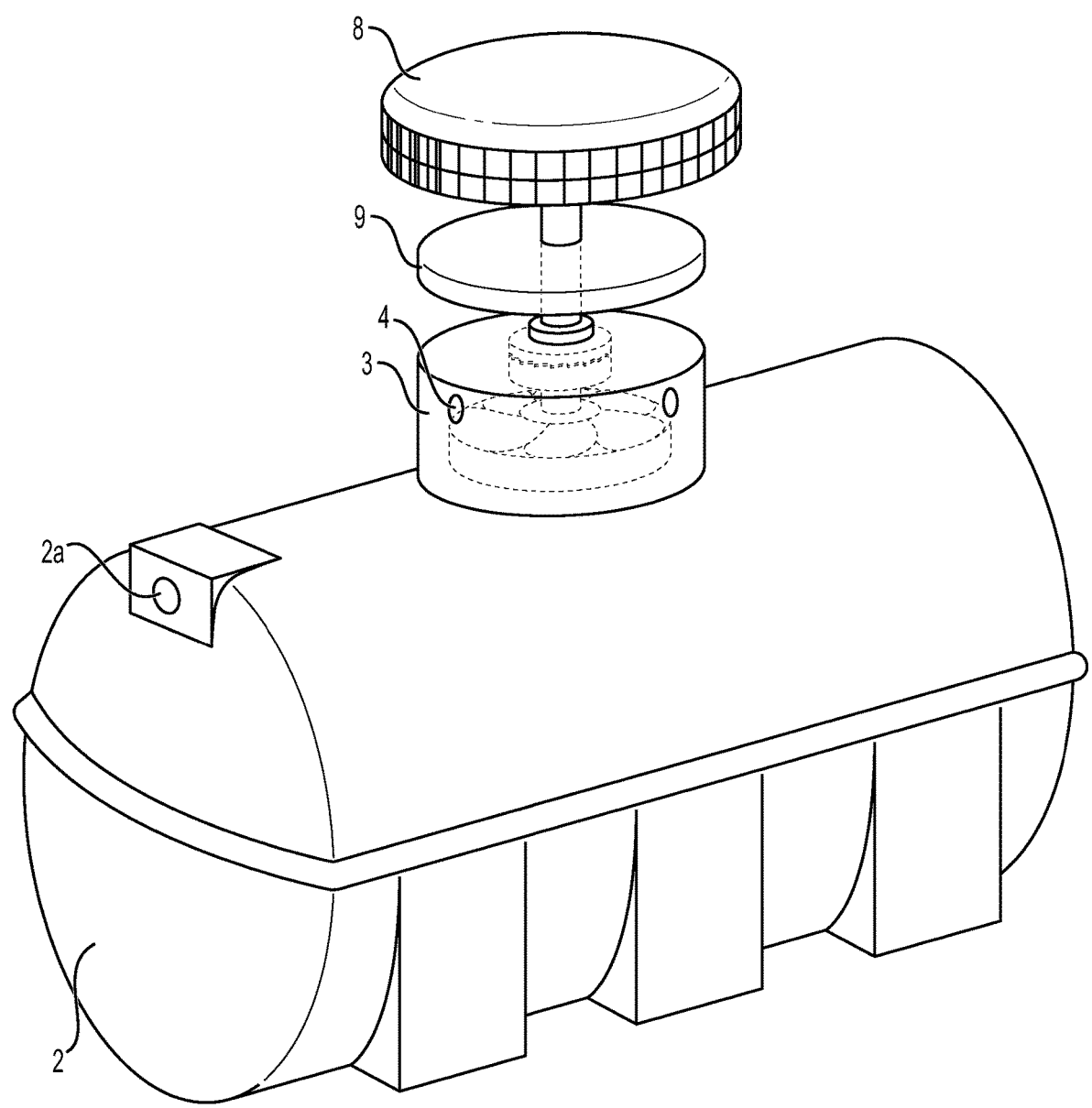
FIG. 2 is an environmental perspective view of a wind energy-based cooling system installed on a storage container.

FIGS. 1-2 show a wind energy-based cooling system 1 for a storage container 2. System 1 includes a housing 3 having one or more walls defining one or more inner surfaces 3a and one or more outer surfaces 3b. The housing includes one or more ventilation openings 4 therein which may be any suitable quantity as well as size and shape.

Means 5, shown as threading on inner surface 3a, are included for connecting the housing 3 to corresponding threads on an access opening of the storage container 2. Together, the housing 3 and the storage container 2 define an enclosure 20. A bearing 6 is fastened on a wall of the housing 3. Bearing 6 may be fastened to housing 3 by any suitable means and/or embedded within the housing 3.

A support shaft 7 is held within the bearing 6. Turbine 8 is in connection with the support shaft 7 and configured to capture wind energy outside of enclosure 20. A flywheel 9 is in connection with the turbine 8 through shaft section 7a, which joins rotor 8 and flywheel 9 together by a coupling 12a, such as a flexible coupling. A gearing arrangement 10 is in connection with the flywheel 9 through shaft section 7b. A rotor 11 is in connection with gearing arrangement 10 through shaft section 7c and coupling 12b, such as a flexible coupling.

The use of flexible couplings 12a, 12b provides compensation for misalignments between shafts 7a-c due to factors such as thermal expansion or dynamic loads. Flexible couplings 12a, 12b help dampen vibrations and shocks between the shafts while still allowing for the transmission of torque therebetween.

Rotor 11 is positioned and configured to direct cooling air to the contents of the storage container 2, by suctioning air through storage container inlet 2a while expelling warm air to the outside through ventilation openings 4. Gearing arrangement 10 may be any suitable gearing arrangement configured to transfer the rotational energy of turbine 8 and flywheel 9 to rotor 11. The gearing arrangement should be configured such that rotor 11 achieves a higher rotational speed than turbine 8 and flywheel 9.

It is to be understood that the wind energy-based cooling system for a storage container is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. A wind energy-based cooling system for a storage container, comprising:
    a housing having one or more walls defining one or more inner surfaces and one or more outer surfaces, wherein the housing includes one or more ventilation openings therein;
    means for connecting the housing to an access opening of the storage container, wherein the housing and the storage container together define an enclosure;
    a bearing fastened on a wall of the housing;
    a support shaft held within the bearing;
    a turbine in connection with the support shaft, the turbine configured to capture wind energy outside of the enclosure;
    a flywheel in connection with the turbine;
    a gearing arrangement in connection with the flywheel;
    a rotor positioned within the enclosure, wherein the rotor is in connection with the gearing arrangement, and configured to direct cooling air to the contents of the storage container.

2. The wind-energy based cooling system for a storage container, as recited in claim 1, wherein the means for connecting to an access opening include threads on the housing.

3. The wind-energy based cooling system for a storage container, as recited in claim 1, wherein the gearing arrangement is configured to increase a rotational speed of the rotor to a greater amount than a rotational speed of the turbine.

4. The wind-energy based cooling system for a storage container, as recited in claim 1, wherein the turbine is connected to the support shaft through a flexible coupling.

5. The wind-energy based cooling system for a storage container, as recited in claim 1, wherein the gearing arrangement is connected to the rotor through a flexible coupling.

6. A storage tank connected to the wind energy-based cooling system of claim 1, wherein contents of the storage tank include water that is circulated in a residential building.

* * * * *